Jan. 31, 1967  A. C. LEENHOUTS  3,302,063
PHASE SEQUENCE SENSOR
Filed Sept. 6, 1963
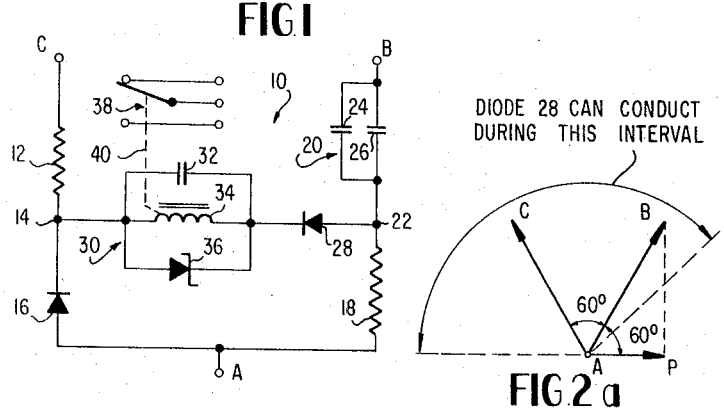
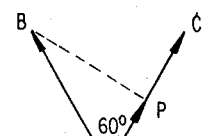
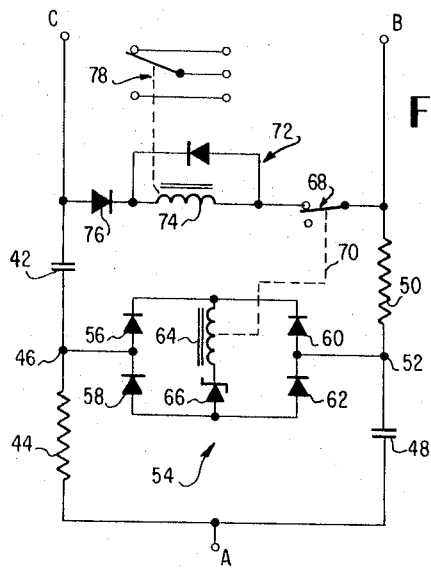
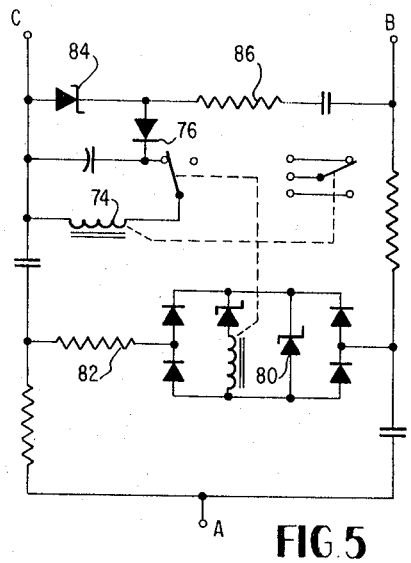
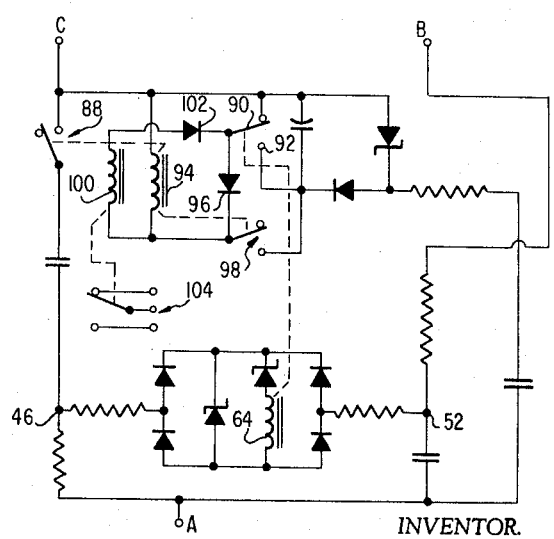
INVENTOR.
ALBERT C. LEENHOUT
BY Lindsey, Prutzman and Hayes
ATTORNEYS

United States Patent Office 3,302,063
Patented Jan. 31, 1967

3,302,063
PHASE SEQUENCE SENSOR
Albert C. Leenhouts, Granby, Conn., assignor to Hi-G, Incorporated, Windsor Locks, Conn., a corporation of Connecticut
Filed Sept. 6, 1963, Ser. No. 307,039
14 Claims. (Cl. 317—47)

This invention relates in general to a detector circuit for a three wire polyphase system. More particularly, this invention relates to a novel electronic switching circuit responsive to the relative phase rotation sequence in such a system, and, in certain embodiments, to the interruption or grounding of any one or more of the input terminals of the circuit.

It is an object of this invention to provide an improved method and apparatus for detecting the relative phase rotation sequence of a three wire polyphase system having a given frequency and substantially equal voltages between wires.

In addition to the detection of relative phase rotation, it is a further object of this invention to provide improved method and apparatus for detecting the interruption or disconnection of any one or more of the three polyphase voltages applied to its input terminals.

It is a further object of this invention to provide a novel electronic switching circuit responsive to the relative phase rotation sequence of a three wire polyphase system, and which operates by means of unique phase shifting and voltage comparison techniques.

It is a further object of this invention to provide such a circuit which is also responsive to the interruption or disconnection of any or more of the three polyphase voltages applied to its input terminals, and, in certain embodiments, is also responsive to the grounding of any one or more of said input voltages.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 shows a schematic circuit diagram of a first embodiment of the invention;

FIGS. 2a and 2b show vector diagrams of certain voltages useful in explaining the operation of the embodiment of FIG. 1;

FIG. 3 shows a schematic circuit diagram of a second embodiment of the invention;

FIGS. 4a and 4b show vector diagrams of certain voltages useful in explaining the operation of the embodiment of FIG. 3; and FIGS. 5 and 6 show schematic circuit diagrams of additional embodiments of the invention.

Turning now to FIG. 1, letters A, B and C designate the three input terminals of a novel switching circuit according to one embodiment of the invention. By way of definition, these letters will be used throughout the specification to refer not only to the three input terminals common to all of the embodiments of the invention, but will also be concurrently used to represent the three cyclic line voltages of a three wire polyphase system present at these input terminals. It is to be understood that such a system commonly involves three separate voltage having the same frequency and substantially equal magnitudes, and being displaced from each other in phase by approximately 120 electrical degrees.

Terminals A, B, and C are adapted to be individually connected to the three wires of a polyphase system by any convenient means, such as terminal clips, not essential to the invention. A resistor 12 is connected between terminal C and a junction point 14, and a diode 16, which may be of any suitable type, such as a semiconductor diode, is connected between junction point 14 and terminal A, poled in the direction shown. A phase shifting network is serially connected between terminals A and B and includes a resistor 18 and a capacitor network 20, defining a junction point 22 therebetween. The capacitor network 20 is shown as comprising parallel capacitors 24 and 26, but it is to be understood that this is merely a matter of expediency, and a single series capacitor may alternately be used, if desired. A diode 28 and a switching unit 30 are serially connected between junction points 22 and 14, with the diode 28 having the polarity shown.

The switching unit 30 comprises a capacitor 32, a relay coil 34, and a Zener diode 36, all connected in parallel. The Zener diode 36 may be omitted if circuit conditions warrant, and is merely included as a protective device to prevent excessive current flow through the relay coil 34. The characteristics of such diodes are well known in the electrical arts per se, and will not be discussed in detail herein. Suffice to state that, when the voltage across the relay coil and Zener diode exceeds the breakdown potential of the latter, the diode 36 will become substantially conductive in the reverse direction, and will furnish a low impedance path around the relay coil.

A set of output contacts 38 is operatively associated with the relay coil 34 by means of a common mechanical interconnection, schematically shown in this instance by dotted line 40. These contacts may ultimately be connected to a suitable indicating device, such as a switchboard, to an alarm, or to a circuit breaker, in accordance with the particular application of the invention. Such ultimate use constitutes no part of the invention, however, and the output taken from the contacts 38 may be employed in any manner desired.

The operation of the embodiment of FIG. 1 may best be understood by referring to the vector diagrams of FIGS. 2a and 2b. Using the voltage existing at terminal A as a reference, the vectors AB and AC represent the voltages existing between terminals A and B, and terminals A and C, respectively. For a normal phase sequence of ABC, the vector AB will lead the vector AC by 60 electrical degrees, as shown in FIG. 2a, while for a reverse phase sequence of ACB, the vector AC will lead the vector AB by 60 electrical degrees, as shown in FIG. 2b. The vector AP represents the voltage existing between terminal A and junction point 22, and the component values of the phase shifting network including the capacitors 24, 26 and the resistor 18 are chosen so that, at the operating frequency of the system with which the invention is to be used, the voltage represented by the vector AP is proportional in magnitude to the voltage between terminals A and B and leads same by approximately 60 electrical degrees.

The two diodes 16 and 28 effect a voltage comparison between the positive component of the voltage AC, as present at junction point 14, and the voltage AP, as present at junction point 22, using the voltage present at terminal A as a reference. As may be seen from FIG. 2a, with a normal phase sequence of ABC the voltage AP leads the voltage AC by 120 electrical degrees, and voltage AP will therefore exceed the positive component of voltage AC for slightly more than ⅓ of a full cycle. During this interval the potential at junction point 22 exceeds the potential at junction point 14, and diode 28 conducts current, thereby energizing the relay coil 34 and causing the output contacts 38 to assume the position shown. While diode 28 is conducting, the capacitor 32 is becoming charged, and subsequently, during the interval when the polarities at the junction points reverse and the diode 28 becomes nonconductive, the capacitor 32 discharges through the relay coil 34. This sequence is repeated during each cycle, and helps to maintain the relay coil in its energized condition during the intervals when diode 28 is nonconductive. The functioning of the capacitor 32 is not necessarily essential to the operation of the relay coil 34, and if the latter has a sufficiently long hold time, the capacitor 32 may be omitted from the circuit. Thus it will be seen that with a normal phase sequence ABC existing between the three wires of the polyphase system, the relay coil 34 will remain substantially energized and will reflect this normal condition at its output contacts 38.

Referring now to FIG. 2b, it will be seen that when a phase sequence reversal ACB occurs, the voltage AC leads the voltage AB by 60 electrical degrees, and consequently, the voltage AP will always be in phase with the voltage AC. Since the magnitude of the latter always exceeds that of AP, junction point 14 will remain positive with respect to junction point 22 throughout the full cycle, and diode 28 will become nonconductive. Under these conditions the relay coil 34 will be de-energized and the position of its output contacts 38 will reverse, thereby reflecting the phase sequence reversal to any associated utilization device.

Considering now an additional feature of the FIG. 1 embodiment, it will be noted that the diode 28 results in half-wave rectification of the current through the relay coil 34. Because of this fact, and further since capacitors 24 and 26 will not pass direct current, the relay coil will become de-energized if the line voltage present at either of the input terminals A or C is interrupted or disconnected. On the other hand, if the voltage at terminal B is interrupted or disconnected, diode 16 virtually shorts the serial chain of resistors 18, diode 28, and relay coil 34 in the conductive direction, while in the other direction both of the diodes 16 and 28 are blocking. Once again, therefore, the relay coil will become de-energized. Obviously there can be no conduction through the relay coil if any two or all three of the input voltages are interrupted since no complete circuit path will then exist.

It will therefore be seen that the relay coil will become de-energized not only in response to a normal phase sequence reversal, but also in response to the interruption or disconnection of any one or more of the voltages applied to the input terminals. It is significant to note at this point that both of these detection functions have been integrated into a unitary structure in the embodiment of FIG. 1, without any substantial sacrifice or impairment of circuit reliability or increase in structural components, and this feature constitutes one of the primary advantages of the invention.

Referring now to the embodiment shown in FIG. 3, a first phase shifting network serially including capacitor 42 and resistor 44, and defining junction point 46 therebetween, is connected between input terminals C and A. Similarly, a second phase shifting network serially including capacitor 48 and resistor 50, and defining junction point 52 therebetween, is connected between input terminals A and B. A diode bridge rectifier 54, including diodes 56, 58, 60, and 62, having the normal polarities as shown, is connected with its input diagonal across junction points 46 and 52. Connected in series across the output diagonal of the bridge is a first relay coil 64 and a Zener diode 66. The Zener diode 66 has a relatively low breakdown voltage, and is included in this instance to insure that no current will pass through the relay coil until the bridge output has reached a sufficient magnitude to cause positive relay actuation, thereby eliminating any contact chatter or false actuation from spurious noise signals. A first set of contacts 68 is operatively associated with the first relay coil 64 through a standard mechanical interconnection, schematically shown by the dotted line 70. One of the contact terminals is directly connected to input terminal B, while the other terminal is connected to a switching unit 72. The switching unit 72 includes a second relay coil 74 and a diode, which eliminates chatter of the contacts associated with coil 74. A diode 76 is connected between the switching unit 72 and input terminal C, poled as shown, and a second set of contacts 78 is operatively associated with the relay coil 74 through the usual connecting linkage.

The operation of the embodiment of FIG. 3 may best be understood by referring to the vector diagrams of FIGS. 4a and 4b. Using the voltage existing at terminal A as a reference, the vectors AB and AC once again represent the voltages existing between terminals A and B, and terminals A and C, respectively. For a normal phase sequence of ABC, the vector AB will lead the vector AC by 60 electrical degrees, as shown in FIG. 4a, while for a reverse phase sequence of ACB, the converse is true. The vector AP represents the voltage existing between terminal A and junction point 52, and the component values of the phase shifting network including the capacitor 48 and the resistor 50 are chosen so that, at the operating frequency of the system with which the invention is to be used, the voltage represented by the vector AP is proportional in magnitude to the voltage AB and lags same by approximately 30 electrical degrees. In a similar manner, the vector AQ represents the voltage existing between terminal A and junction point 46, and the component values of the phase shifting network including the capacitor 42 and the resistor 44 are chosen so that the voltage represented by the vector AQ is proportional in magnitude to the voltage AC and leads same by approximately 30 electrical degrees. As may be seen from FIG. 4a, for a normal phase sequence ABC the voltage vectors AP and AQ are coincident in magnitude and phase, and therefore no net potential difference exists between the junction points 46 and 52. Under these conditions, no current will flow through the rectifier bridge 54 and the first relay coil 64 will remain de-energized, with its associated contacts 68 in the closed position, as shown. With the first set of contacts 68 closed, a circuit path is completed between terminals B and C through the second relay coil 74. This coil will then be energized by a half-wave rectified signal, owing to the presence of diode 76, and the second or output set of contacts 78 will assume the position shown, thus indicating a normal phase sequence, the presence of the three input voltages, and the absence of any ground faults.

On the other hand, if phase sequence ACB is applied, a net potential difference will now exist between the junction points 46 and 52, as may be readily seen from FIG. 4b, and current will flow through the diode bridge. The Zener diode 66 will break down and become conductive in the reverse direction, and the first relay coil 64 will become energized, thus opening the first set of contacts 68 and interrupting the circuit path through the second relay coil 74. This latter coil will now become de-energized and its contacts 78 will reverse, thus indicating a phase sequence reversal to whatever utilization device is employed.

In addition, it will be readily seen that a potential difference also exists between junction points 46 and 52 whenever any one of the input voltages is interrupted or whenever any one or two of the input terminals are grounded. The first relay coil will therefore become energized in response to any one of these conditions, as well as in response to a phase sequence reversal, and the same chain of events described above will take place. It will be observed, however, that if any two or more input voltages are interrupted, or if all three input terminals are grounded, there will be no potential difference between the junctions 46 and 52, and the first relay coil 64 will therefore not respond to these conditions. In order to increase the over-all circuit response to include these last named conditions, the second relay coil 74 has been included, and is arranged to be energized through the contacts of the first relay coil. It will now be seen that if any two or more input voltages are interrupted, or if all three input terminals are grounded, the second relay coil 74 will become de-energized even though the contacts 68 remain closed. In this manner, the circuit shown in FIG. 3 will respond not only to a phase sequence reversal, but also to the interruption or grounding of any one or more of the three polyphase input voltages.

The embodiments shown in FIGS. 5 and 6 are quite similar in nature to the embodiment of FIG. 3 described above, with certain modifications having been included to afford increased circuit protection and to enhance the over-all circuit reliability. In FIG. 5 an additional Zener diode 80 has been placed in parallel with the first relay coil to protect the bridge diodes from excessive inverse voltages, and a limiting resistor 82 has been added in series with the diode bridge to protect Zener diode 80 against excessive rush-in currents. In addition, a Zener diode 84 is now connected across the diode 76 as well as the second relay coil 74, to protect both of these circuit components from damaging voltages, and a series limiting resistor 86 functions in the same general manner as does resistor 82.

The embodiment of FIG. 6 contains all of the features and advantages of the embodiments of FIGS. 3 and 5, and in addition, includes further circuitry to provide for the "fail-safe" operation of the first relay coil 64; i.e., the circuit checks the operability of the first relay coil before the final output contacts are switched to the "no fault" or "go" position. In operation, when the three input voltages are connected to terminals A, B and C, the open contact switch 88 results in an artificial interruption of the terminal C voltage. This creates a potential difference across junction points 46 and 52, causing the first relay coil 64 to become temporarily energized. The switch arm 90 is pulled down to the contact terminal 92, thereby energizing a second relay coil 94 through the diode 96. When the second relay coil becomes energized, its associated contact switches 88 and 98 reverse or pull in. The pulling in of switch 88 corrects the artificial interruption of the terminal C voltage, while the pulling in of switch 98 locks the second relay 94 in the energized condition by by-passing switch arm 90 and contact terminal 92. If a normal phase sequence exists and no other fault conditions are present, the first relay coil 64 now becomes de-energized and its associated switch arm 90 returns to the position shown. This in turn causes a third relay coil 100 to become energized through diode 102 and contact switch 98, and the associated output contacts 104 are pulled in to the "no fault" position, thus indicating normal circuit conditions. In this manner, the third or output relay 100 can only transfer if the first relay 64 has been proven operative, and has dropped out again.

As will be apparent to persons skilled in the art, various modifications and adaptations of the structure above described will become readily apparent without departure from the spirit and scope of the invention, the scope of which is defined in the appended claims.

I claim:

1. A switching apparatus responsive to the relative phase rotation sequence of a three wire polyphase system having a given frequency and substantially equal voltages between wires, comprising:
   (a) three input terminals A, B and C for individual connection to the three wires of a polyphase system,
   (b) phase shifting means serially including a resistor and a capacitor and having a common first junction point therebetween, said phase shifting means being connected between terminals A and B for deriving a voltage at the first junction point proportional to the voltage existing between terminals A and B and shifted in phase therefrom by a predetermined amount.
   (c) circuit means including a second junction point connected between terminals A and C for deriving a voltage at the second junction point bearing a predetermined phase relationship to the voltage existing between terminals A and C, and
   (d) diode comparator means including a relay coil connected between said first and second junction points for comparing the two derived voltages, whereby the energization of the relay coil is controlled by the comparator means in response to the relative phase rotation sequence existing between the three wires.

2. A switching apparatus responsive to the relative phase rotation sequence of a three wire polyphase system having a given frequency and substantially equal voltages between wires and to the absence of any one or more of the three polyphase voltages, comprising:
   (a) three input terminals A, B, and C for individual connection to the three wires of a polyphase system,
   (b) phase shifting means serially connected between terminals A and B for deriving a voltage proportional to the voltage existing between terminals A and B and leading same by approximately 60 electrical degrees,
   (c) a first unidirectionally conducting element connected between terminals A and C, and
   (d) means serially including a switching device and a second unidirectionally conducting element connected between the phase shifting means and the first unidirectionally conducting element, whereby the unidirectionally conducting elements effect a comparison between the positive components of the voltage derived by the phase shifting means and the voltage existing between terminals A and C, in response to which the switching device is actuated only when a normal phase sequence ABC exists and when all of the three polyphase voltages are present.

3. A switching apparatus as defined in claim 2, wherein the phase shifting means serially includes a resistor and a capacitor.

4. A switching apparatus as defined in claim 3, wherein the unidirectionally conducting elements are diodes and the switching device is a relay coil.

5. A switching apparatus as defined in claim 4, wherein the second diode is connected between one end of the relay coil and the junction between the resistor and capacitor of the phase shifting means, the other end of the relay coil is connected between the first diode and the terminal C, and both diodes are positively poled toward terminal C.

6. A switching apparatus as defined in claim 5, further including a Zener diode connected in parallel with the relay coil to protect same from excessive currents and a capacitor connected in parallel with the relay coil to stabilize the current flow therethrough during nonconductive half-cycles of the second diode.

7. A switching apparatus responsive to the relative phase rotation sequence of a three wire polyphase system having a given frequency and substantially equal voltages between wires, to the absence of any one of the three polyphase voltages, and to the grounding of any one or two of the wires, comprising:
   (a) three input terminals A, B and C for individual connection to the three wires of a polyphase system,
   (b) first phase shifting means serially connected between terminals A and B for deriving a voltage proportional to the voltage existing between terminals A and B and lagging same by approximately 30 electrical degrees,
   (c) second phase shifting means serially connected between terminals A and C for deriving a voltage proportional to the voltage existing between terminals A and C and leading same by approximately 30 electrical degrees, and
   (d) comparison means including a first switching device connected between the first and second phase shifting means for comparing the two voltages derived by the phase shifting means, whereby the first switching device is energized by a lack of substantial equality between said two derived voltages in response to a normal phase sequence reversal ACB, the absence of any one of the three polyphase voltages, or the grounding of any one or two of the input terminals.

8. A switching apparatus as defined in claim 7, wherein each of the first and second phase shifting means serially includes a resistor and a capacitor, and the first switching device is a relay coil.

9. A switching apparatus as defined in claim 8, wherein the comparison means comprises a diode bridge network in which the relay coil is connected across one diagonal and the other diagonal is connected between the junctions of the resistors and the capacitors in the first and second phase shifting means.

10. A switching apparatus as defined in claim 7, further comprising a second switching device having one end connected to terminal C, and a first set of contacts operatively associated with the first switching device and connected between the other end of the second switching device and terminal B, the first set of contacts being closed when the first switching device is de-energized, whereby the second switching device is de-energized in response to the energization of the first switching device, the absence of two or more of the polyphase voltages, or the grounding of the three input terminals.

11. A switching apparatus as defined in claim 10, wherein each of the first and second phase shifting means serially includes a resistor and a capacitor, and the first and second switching devices are relay coils.

12. A switching apparatus as defined in claim 11, wherein the comparison means comprises a diode bridge network in which the first relay coil is connected across one diagonal and the other diagonal is connected between the junctions of the resistors and the capacitors in the first and second phase shifting means.

13. A switching apparatus as defined in claim 12, further comprising Zener diode means connected in parallel with each relay coil to protect same from excessive currents.

14. A switching apparatus as defined in claim 12, further comprising means for ascertaining that the first relay coil is operable before the second relay coil can become energized.

References Cited by the Examiner
UNITED STATES PATENTS

| | | | |
|---|---|---|---|
| 2,836,771 | 5/1958 | Jessee | 317—47 |
| 3,021,453 | 2/1962 | Faglie | 317—27 |
| 3,160,786 | 12/1964 | Faglie | 317—27 |
| 3,184,644 | 5/1965 | Faglie | 317—27 X |

FOREIGN PATENTS 361,934  11/1931  Great Britain.

MILTON O. HIRSHFIELD, *Primary Examiner.*

R. V. LUPO, *Assistant Examiner.*